United States Patent [19]

Herkes et al.

[11] 4,041,834
[45] Aug. 16, 1977

[54] PLASTIC HEADED FASTENER ASSEMBLY

[75] Inventors: Daniel Joseph Herkes, Aurora; Ernest William Reinwall, Jr., McHenry, both of Ill.

[73] Assignee: Illinois Tool Works Inc., Chicago, Ill.

[21] Appl. No.: 717,295

[22] Filed: Aug. 24, 1976

[51] Int. Cl.² .................... F16B 23/00; F16B 35/06
[52] U.S. Cl. ................................... 85/45; 85/1 JP
[58] Field of Search ............... 85/45, 53, 54, 55, 9 R, 85/1 JP, 1 C, 10 F, 47; 145/50 R, 50 D, 50 B, 50 A

[56] References Cited

U.S. PATENT DOCUMENTS

| 1,433,783 | 10/1922 | Carr | 85/55 X |
| 2,326,455 | 8/1943 | Gray | 85/1 JP |
| 3,134,290 | 5/1964 | Jentoft | 85/54 X |
| 3,269,250 | 8/1966 | Curtiss | 85/45 |
| 3,396,765 | 8/1968 | Ridenour | 85/45 X |
| 3,517,581 | 6/1970 | Stokes et al. | 85/47 |
| 3,557,654 | 1/1971 | Weidner | 85/9 R |
| 3,592,100 | 7/1971 | Mackiewicz | 85/9 R X |
| 3,693,495 | 9/1972 | Wagner | 85/9 R |
| 3,885,492 | 5/1975 | Gutshall | 85/1 JP X |
| 3,897,712 | 8/1975 | Black | 85/9 R |

FOREIGN PATENT DOCUMENTS

| 64,946 | 7/1955 | France | 85/45 |
| 2,443,013 | 4/1975 | Germany | 85/45 |

Primary Examiner—Ramon S. Britts
Attorney, Agent, or Firm—Thomas W. Buckman; Robert W. Beart

[57] ABSTRACT

A threaded fastener unit and driver system for maximizing driving force distribution, the fastener unit having a composite head section comprised of a thin-walled uniform thickness plastic coating covering all surfaces of an enlarged head portion on a drilling or tapping device. The composite head includes internal torque transmitting surfaces formed by slots intersecting at generally right angles to one another forming four upstanding posts with a radially extending flange at the base of the posts. The fastener unit is configured so that the driving force distribution is maximized to eliminate damage to the plastic during installation of the fastener in a workiece.

4 Claims, 12 Drawing Figures

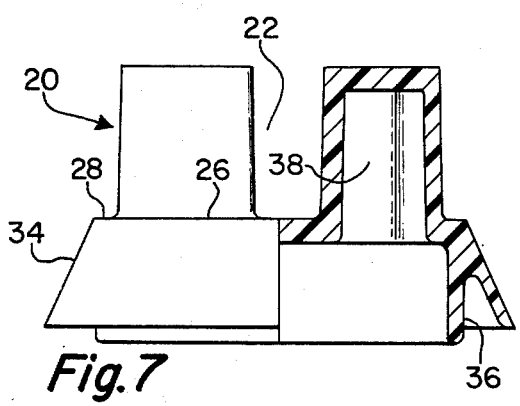
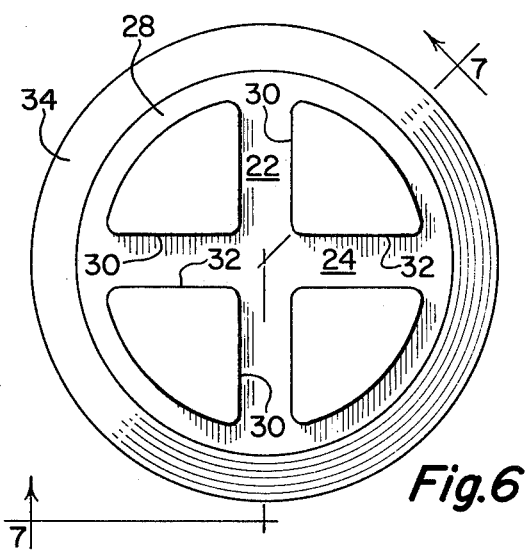
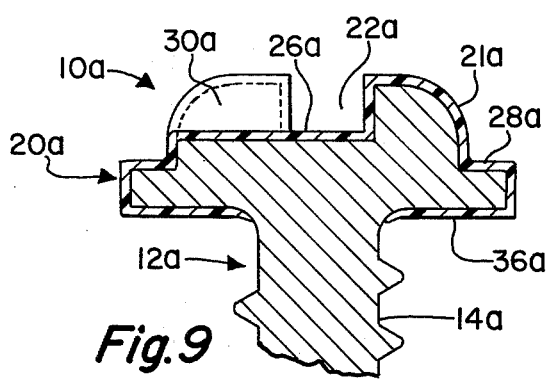
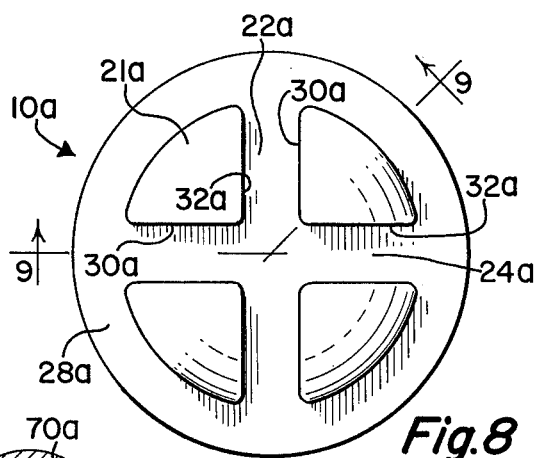
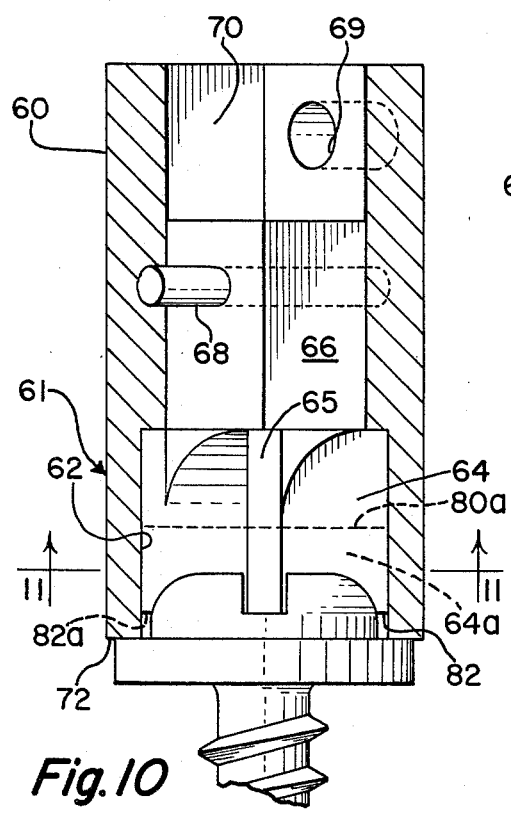
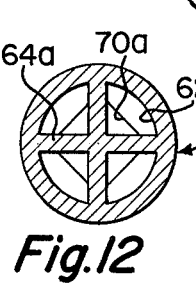
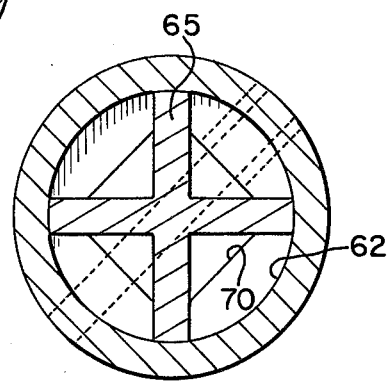

PLASTIC HEADED FASTENER ASSEMBLY

BACKGROUND OF THE INVENTION

This invention relates generally to a corrosive-resistant composite head fastener and more particularly to plastic coated head on a self-drilling or tapping fastener.

Prior art devices of the general catagory are primarily used to provide corrosive or weather resistance to threaded fasteners in the building construction field. The use of plastic on the heads of such fasteners enables the fasteners to also be color coordinated with a variety of colors of exterior building panels. Prior art composite headed fasteners typically cap, mold or otherwise form plastic material over an enlarged metal head to provide external wrenching surfaces for association with a socket-type driving tool. Since plastic material is weak and will fail in shear and/or compression, the prior art devices are deficient in their ability to transmit the high torque requirements in a self-tapping or drilling environment to the threaded shank. The excessive torques required to seat such a fastener tend to localize or be concentrated at the edges of the external plastic wrenching surfaces, causing the plastic to rupture, break or round over prior to reaching the desired torque.

Certain other prior art devices may not fail in their extenal surfaces but still are not capable of withstanding high torques because the plastic fails to interlock effectively with the underlying head, thus permitting the plastic to spin relative to the metal head.

While plastic headed fasteners of the prior art theoretically provide color matching, sealing and corrosive resistant characteristics, they have outstanding deficiencies in failure prior to seating or completely installing the fastener.

SUMMARY OF THe INVENTION

It is a primary object of the invention to provide a plastic-headed fastener capable of accepting high torque and/or high impact driving.

Another object of the invention is to provide a corrosive resistant threaded fastener which is capable of accepting the high torque forces necessary to drill and/or tap without harming the corrosive resistant head coating.

It is still another object of the invention to provide a composite fastener unit with high resistance to stripping or failure between the plastic and metal body of the fastener.

Yet another object of this invention is the provision of a fastener head and driver system which in combination reduces the concentration of high forces on plastic coating material.

A particular object of this invention is to provide a fastener head design and driver design which reduces the concentration of high forces on corrosive resistant coatings on the fastener head and insures stability of driving in high torque self-drilling or tapping applications.

An advantage of the invention is the provision of a fastener with a relatively small head capable of accepting high driving forces.

The objects and advantages of the invention are achieved with a composite head on a self-drilling or tapping fastener which includes a cross-slot recess basically formed by a pair of slots intersecting at right angles and extending through the outer periphery of the upstanding head portion. A further important aspect of the invention is a radially extending flange at the base of the upstanding head portion serving as an alignment and support surface for an associated driving tool.

The four posts formed by the intersecting slots provide substantially flat internal bearing surfaces extending generally perpendicularly to the base of the slot which receive a corresponding cruciform-shaped driver bit in such a manner as to distribute the compressive force on a thin-walled plastic coating over four substantially equal bearing surface areas. The configuration of four posts and the accompanying four bearing surfaces have been proven to provide the maximum force distribution for a given dimensioned head. The invention insures that the force transmitted to the head is in a totally compressive direction which eliminates head failures by camming, shearing of the plastic coating from the head. However, since thin-wall plastic is extremely weak in compression, it is essential that the force be distributed in such a manner as to prevent failure in compression. The surface contact area provided by the four substantially equal upstanding posts maximizes the area to accept driving torque, thus optimizing the force distribution.

It has been found that a composite head designed substantially in accordance with prior art teachings utilizing external driving surfaces on a predetermined size head would produce stripping and shearing failure at approximately 60 inch pounds of drive torque, while the cross-slot configuration of the present invention for a comparable size head would resist failure up to approximately two hundred inch pounds of drive torque.

For a better understanding of the present invention together with other and further objects thereof, reference is made to the following description taken in conjunction with the accompanying drawings.

BRIEF DESCRIPTION OF THE DRAWINGS

FIG. 6 is a top plan view of the plastic cap utilized in the composite fastener of this invention;

FIG. 7 is a side elevation in partial section taken along lines 7—7 of the cap shown in FIG. 6;

FIG. 8 is a top plan view of an alternate embodiment of the composite fastener unit of the present invention;

FIG. 9 is a longitudinal cross section view of the alternate embodiment taken along lines 9—9 of FIG. 8;

FIG. 10 is a partial sectional view of th invention illustrating a driver system and a modification thereof in dotted lines for use with fastener device of this invention;

FIG. 11 is a transverse sectional view of the driver taken along lines 11—11 of FIG. 10, and FIG. 12 is a reduced transverse sectional view of the modification of the driver also taken along lines 11—11 of FIG. 10.

DETAILED DESCRIPTION OF THE INVENTION

Figure 1:
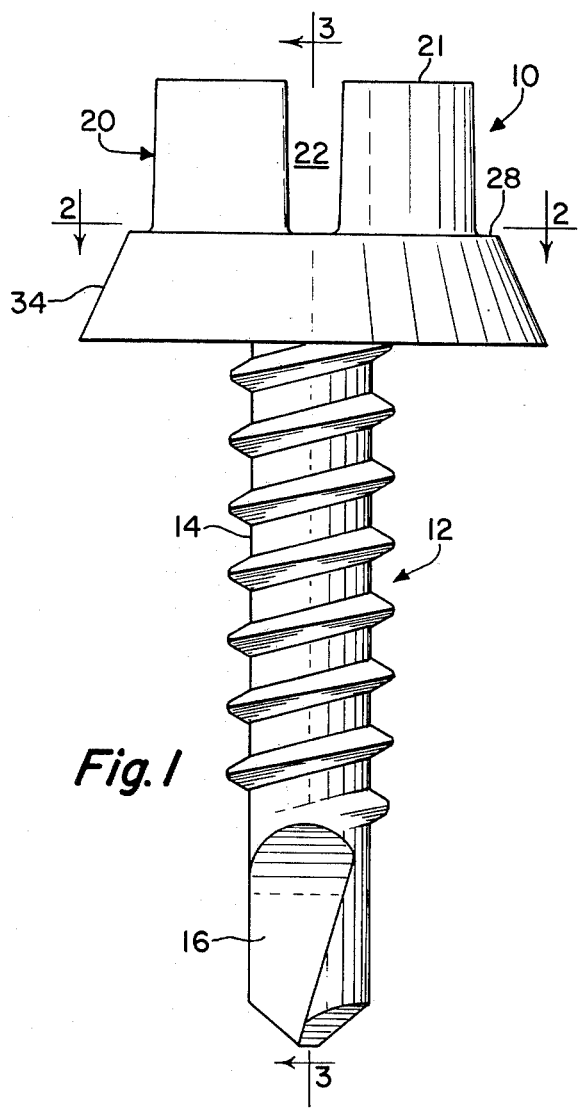
FIG. 1 is a side elevational view of the composite fastener device of the invention.
Figure 2:
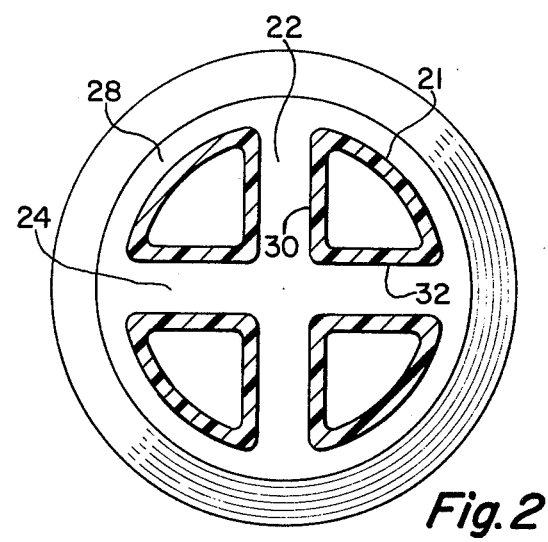
FIG. 2 is a transverse cross-section view taken along lines 2—2 of the head of the fastener of FIG. 1.
Figure 3:
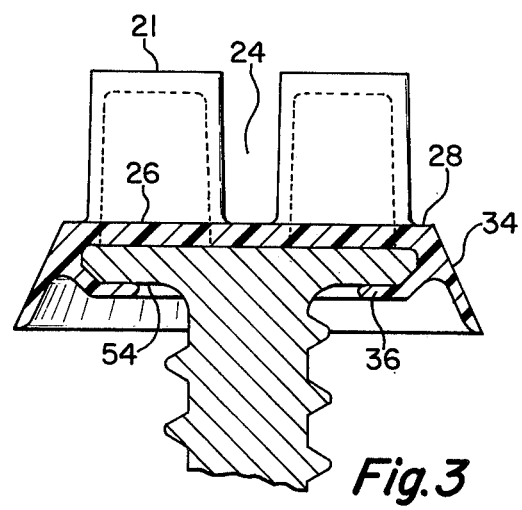
FIG. 3 is a longitudinal cross-section view taken along lines 3—3 of the fastener device of FIG. 1.

Referring to the drawings and in particular to FIGS. 1-3, there is shown a fastener unit 10 which includes a metallic fastener body 12 having a threaded shank 14 and preferably including a drill point 16. A plastic cap 20 is fitted over a mating enlarged head portion which is an integral part of the fastener body 12.

A top plan view of the head reveals that the driving surfaces of the composite unit are in the form of a cruciform provided by a pair of intersecting axial extending slots 22 and 24. These intersecting slots will form four upstanding post regions 21 with a peripheral flange 28 extending radially beyond the posts. A pair of perpendicularly intersecting, internal bearing surfaces 30 and 32 are formed on each post as a result of the slot configuration.

The plastic cap 20 may be secured to the head of the metallic body in a manner such as shown in FIG. 3 which typically would be through the use of ultrasonic or other heat forming processes to secure a radially inwardly extending skirt 36 from the cap preform to the bearing surface 54 of the head.

Figure 4:
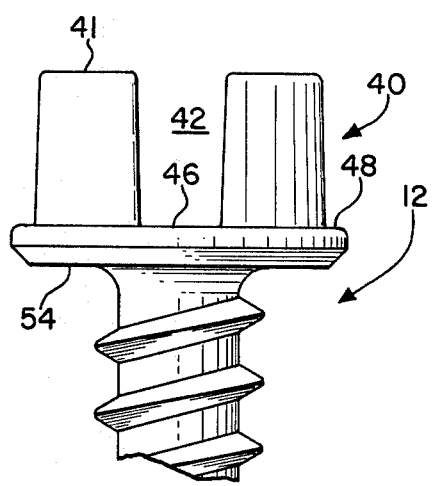
FIG. 4 is a partial side elevational view of the head portion of the metal fastener body of the invention without the plastic coating.
Figure 5:
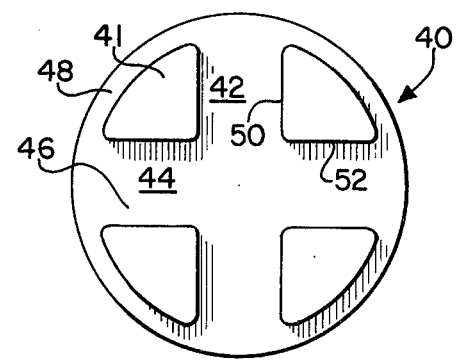
FIG. 5 is a top plan view of the metal fastener head shown in FIG. 4.

A metallic body of the fastener, and more particularly the enlarged head region, is shown in FIGS. 4 and 5 and it will be apparent that the configuration of this head is substantially identical and mating with an overcap of thin wall plastic. Head 40 thus will include four posts 41 formed by a pair of slots 42 and 44 with the base 46 of the slots extending in a plane which is substantially perpendicular to the central axis of the fastener. The internal bearing surfaces 50 and 52 of each post will likewise extend substantially perpendicular to the base of the slots with the normal draft required in a heading operation. The radially extending flange 48 extends beyond the posts 41 with the bottom surface 54 forming the clamping surface of the fastener upon which the plastic overcap material is secured.

Turning now to FIG. 6 and FIG. 7 and with reference to FIGS. 4 and 5, it will be shown that the cap 20 used in the invention is basically a preform, having substantially constant and thin wall thickness. Upstanding cavities 38 are formed so as to closely surround and abut the peripheral surfaces of the posts 41 on the metallic head. The preferred embodiment of this invention will include an outer skirt 34 and a downwardly extending securing skirt 36. In assembly, the downwardly extending skirt 36 is formed inwardly and upwardly against the bearing surface of the fastener head to preassemble the two components and provide a layer of sealing material between the fastener body and the workpiece.

The transversely extending, intersecting slots 22 and 24 in the composite head will form a pair of flat, generally perpendicular bearing surfaces for each upstanding post. The plastic overcap 20 provides a thin wall of plastic material interposed between the atmosphere and the metal body, thus providing a corrosive-resistant layer for the fastener head. The transversely extending slots 22 and 24 will intersect one another at midpoint and at generally the central axis of the fastener, thus, the internal bearing surfaces 30 and 32 will be equal. It has been found that the arrangement of two intersecting slots, providing four equal bearing surfaces for a given direction of rotation, results in the optimum or maximization of surface area available for contact by a blade type driving bit. The four-posted arrangement also provides the optimum shear area available for the metal body taking into consideration the optimization of the surface area.

Since thin-wall plastic is weak in compression, considerations must be given to reduce the concentration of force in a small area; thus, the maximization of surface area is essential in the invention. For example, a representative head constructed in accordance with this invention with internal bearing surfaces each of 0.132 in radial extend and 0.200 in height would provide 0.105 square inches or pressure area. Thus, for a load of approximately two hundred inch pounds, the head would be capable of accepting 13,799 psi. These figures indicate that with a typical 14,000 psi tensile yield plastic and a conventional screw gun, which will stall out at approximately two hundred inch pounds of torque, the design will resist failure. A representative external drive plastic coated or capped head may typically fail by shearing or compression of the plastic at 60 inch pounds of torque.

High torque requirements such as fastening self-drilling screws also require a high impact or axial force to affect the fastening. With this in mind, the peripheral flange 28 is designed to accept the axial loads and distribute such loads over a substantial surface area. This configuration will, therefore, eliminate substantial axial or impact loads in the cross recess area. Since slots 22 and 24 intersect the outer periphery of the composite head, they will accept corresponding blade-type bit and reduce local pressure at the edges of the bit. This slot arrangement also eliminates the possiblities of camming the bit out of the recess since the pressure will be substantially perpendicular to a radius of the fastener and exerted almost entirely on the flat bearing surfaces of the coated posts.

The composite fastener unit of the preferred embodiment tends to reduce the inventory of the finished product in that preforms of a given color may be manufactured and stored independently of the metal body portions and allows the two parts to be assembled and secured upon receipt of an order.

Turning to FIGS. 7 and 8, an alternate embodiment of the invention incorporating features similar to that described above will be shown. Fastener unit 10a consists basically of a body 12a having a shank 14a which is provided with a thin walled plastic overcap or coating 20a. In this embodiment, however, it is contemplated that the plastic coating be provided through a painting or fluidized bed operating providing a conformally adhered layer over the head surfaces.

The unit 10a will again include four upstanding and equally spaced posts 21a with a thin wall of plastic surrounding the exposed surfaces thereof. A radially extending periperal surface 28a is similarly provided beyond the post regions. The design shown in FIG. 9 is of a low height head and having an outer peripheral surface of generally dome shape with the floor 26a of the slots being slightly spaced above the peripheral surface 28a. Such a design will be slightly easier to produce in a cold-heading operation because there is a small amount of material to be moved. The novel design of the invention will permit the use of small internal bearing surfaces 30a and 32a because of the optimum distribution of forces on a screw head as described above.

FIGS. 10 – 12 describe a tool and fastening procedure that is useful in securing fasteners of the type described. A tool 60 will include a generally circular recess 62 in one end forming a sleeve 61 and counter bore of generally polygonal configuration 70 spaced upwardly therefrom. The counter bore receives the shaft 66 of a driving bit having blades 65 of generally cruciform shape and which is designed to matingly engage the cross slots 22 and 24 or 22a and 24a. It will be noted that the blades extend beyond the periphery of the upstanding posts to insure that there is no localized pressure point. The bit 64 is retained within the tool and constrained from relative axial or rotational movement by pin member 68. In operation, the tool is secured in a suitable rotary driving tool by a recess 69 and detent in the driving tool. The leading surface 72 of the sleeve abuts the outer peripheral flange 28 or 28a and, thus, the axial or impact force is distributed over a substantial area. The recess 62 should be greater than the maximum transverse dimension of the post region of head 20 and 20a, but less than the diameter of flange 28 or 28a. The axial extent of recess 62 should be not less than, and preferably greater than, the axial extent of the bit 64. The leading edge 82 of the bit is shown to be spaced slightly above the leading surface 72 to insure abuting contact between the sleeve and the flange of the fastener. The bit 64 is thus free to transmit solely torque to the internal bearing surfaces. Thus, the total force transmitted to a plastic coating head is more conveniently and efficiently distributed over many areas and surfaces of the plastic. The use of the recess and leading edge thereof in cooperation with the peripheral surface provides an alignment configuration which is beneficial in insuring that the bit is properly and equally distributed within the cross recess. The closely coupled arrangement between the interior of the sleeve and the outer peripheral surface of the fastener head contains and further stabilizes the system during drilling.

It should be apparent that the tool thus described could be a unitary configuration. The dotted line 80a represents an uppermost edge on web-like blades 64a formed integral with a sleeve 61a of slightly modified version of the invention to provide such a unitary structure. FIG. 12 is a reduced cross section of such a modification to the tool and is also taken along the lines 11—11.

Thus, it is apparent that there has been provided in accordance with the invention a composite headed fastener of a plastic coated variety and driver and driven fastener system that fully satisfies the objects and advantages and aims set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

We claim:

1. A threaded fastener with a composite, corrosive resistant head, including a metal body with a threaded shank and an integral radially enlarged head portion at one extremity and a drill point at the other extremity, a pair of slots formed in the head portion intersecting at right angles at their midpoints and at the axis of the threaded shank, the slots extending transversely of the head intersecting the outer periphery thereof, a flange extending radially outwardly of the head the bottommost surface thereof forming the clamping surface of the head portion, the slots defining four upstanding posts, each post thereby including a pair of internal, intersecting planar surfaces extending substantially perpendicular to the base of the slots and to each other, the base of the slots being coplanar and substantially perpendicular to the longitudinal axis of the fastener, a thin-walled, substantially uniform thickness of corrosive resistant thermoplastic coating covering all surfaces of the enlarged head portion including the flange, the outer periphery of the flange and at least the radial outermost surface region of the surface beneath the flange forming the clamping surface, the composite head thus providing a cruciform slot configuration presenting eight substantially equal, flat internal bearing surfaces maximizing the surface area on which a mating driving tool applies a rotary inducing force on four of said internal surfaces when torque is applied in a given direction compressing the plastic coating against the upstanding posts to minimize the stress on the thermoplastic material when subjected to large torque required in drilling and setting the fastener.

2. The composite fastener in accordance with claim 1, wherein the plastic coating is in the form of a plastic overcap fitted over said enlarged head with a skirt extending beneath and secured to the outer peripheral region of the clamping surface.

3. The composite fastener in accordance with claim 2, including an outermost sealing skirt extending outwardly and downwardly of the clamping surface and adapted to resiliently and sealingly engage the workpiece closely adjacent the clamping surface of the fastener head.

4. The composite fastener in accordance with claim 1, wherein the coating is a conformally adhered layer of limited thickness formed on the exposed surfaces of the enlarged head.

* * * * *